United States Patent [19]

Kuorsawa et al.

[11] Patent Number: 5,241,674
[45] Date of Patent: Aug. 31, 1993

[54] ELECTRONIC DICTIONARY SYSTEM WITH AUTOMATIC EXTRACTION AND RECOGNITION OF LETTER PATTERN SERIES TO SPEED UP THE DICTIONARY LOOKUP OPERATION

[75] Inventors: Yoshiaki Kuorsawa, Yokohama; Kaoru Suzuki, Kawasaki, both of Japan

[73] Assignee: Kabushiki Kaisha Toshiba, Kawasaki, Japan

[21] Appl. No.: 672,550

[22] Filed: Mar. 21, 1991

[30] Foreign Application Priority Data

Mar. 22, 1990 [JP] Japan ................... 2-69701

[51] Int. Cl.$^5$ ............... G06F 15/20; G06F 15/62
[52] U.S. Cl. ............... 395/600; 364/419.11; 364/225.6; 364/225.3; 364/DIG. 1; 364/943
[58] Field of Search ............... 395/600; 364/419

[56] References Cited

U.S. PATENT DOCUMENTS

| | | | |
|---|---|---|---|
| 4,809,214 | 2/1989 | Shimakura | 395/600 |
| 4,823,306 | 3/1989 | Barbic et al. | 395/600 |
| 4,862,408 | 8/1989 | Zamora | 395/600 |
| 4,876,665 | 10/1989 | Iwai et al. | 395/600 |
| 4,907,188 | 3/1990 | Suzuki et al. | 395/600 |
| 4,918,588 | 3/1990 | Barrett et al. | 395/600 |
| 5,003,614 | 3/1991 | Tanaka et al. | 382/18 |
| 5,129,012 | 7/1992 | Abe | 382/16 |

FOREIGN PATENT DOCUMENTS

| | | |
|---|---|---|
| 63-141179 | 6/1988 | Japan . |
| 64-57370 | 3/1989 | Japan . |
| 1-69673 | 7/1989 | Japan . |

*Primary Examiner*—Thomas C. Lee
*Assistant Examiner*—Peter Y. Wang
*Attorney, Agent, or Firm*—Foley & Lardner

[57] ABSTRACT

An electronic dictionary apparatus which is capable of actively supporting the thinking of the user during its use, and which has the improved maneuverability and the wider utility. In the apparatus, each letter pattern series in the entered input document is automatically extracted and recognized in order to obtain a corresponding letter code series; then the entered input document superposed with an enclosure image enclosing each letter pattern series for each of the extracted and recognized letter pattern series is displayed; then a user specifies a desired one of the displayed letter pattern series enclosed by the enclosure image; and then information on the letter code series corresponding to the specified letter pattern series is looked up in the database containing prepared information on a number of letter patterns in terms of letter codes.

8 Claims, 4 Drawing Sheets

ELECTRONIC DICTIONARY SYSTEM WITH AUTOMATIC EXTRACTION AND RECOGNITION OF LETTER PATTERN SERIES TO SPEED UP THE DICTIONARY LOOKUP OPERATION

BACKGROUND OF THE INVENTION

1. Field of the Invention

The present invention relates to an electronic dictionary apparatus for recognizing a written work pattern as a letter series by using an image input function, and looking up a related information, such as a translation of the recognized letter series.

2. Description of the Background Art

Various electronic dictionary apparatuses have recently been developed. Most typically, the conventional electronic dictionary apparatus has a configuration in which a word or a phrase is entered through a key typing, and information related to it, such as its translation, means, related idiomatic phrases etc., is looked up.

For example, the electronic dictionary apparatus disclosed in the Japanese Patent Application Laid Open No. 53-56925 (1978) has a configuration which is capable of looking up homophones. Another example is the electronic dictionary apparatus disclosed in the Japanese Patent Application Laid Open No. 57-113177 (1982), which has a configuration which is capable of looking up synonyms and antonyms. Yet another example is the electronic dictionary apparatus disclosed in the Japanese Patent Application Laid Open No. 54-34653 (1979) which has a configuration which includes a function for outputting the pronunciation of the word to be looked up in the form of the synthesized voice sound.

However, in these conventional electronic dictionary apparatuses, the word to be looked up must be inputted by key typing, so that they were not quite convenient to use.

In order to improve on this problem of the convenience in use, there had been propositions of the electronic dictionary apparatus incorporating a letter recognition device, such as those disclosed in the Japanese Patent Application Laid Open No. 57-10876 (1982) and the Japanese Patent Application Laid Open No. 57-150874 (1982). In this type of the electronic dictionary apparatus, any word pattern written on a manuscript can be read in by a hand scanner as the letter pattern series, and the dictionary looks it up by using the letter code series obtained by recognizing the entered letter pattern series.

However, in this type of the electronic dictionary apparatus, it is necessary to input the letter pattern series for a work or phrase to be looked up one by one, so that is has been rather difficult to expand the usage of the dictionary beyond the ordinary dictionary looking up of a work to find out its meaning.

Moreover, the capability of the electronic dictionary apparatus itself is limited to only recognition of the input pattern series and the looking up of the obtained letter code series, and not extended to the level of realizing the relationships among a plurality of input pattern series. As a consequence, such as electronic dictionary apparatus could hardly be useful in the intelligence processes of a much higher level which utilizes the relationship among the plurality of the input pattern series, such as context information.

Furthermore, actual use of this type of electronic dictionary apparatus inevitably takes a mode in which the user first finds out the portion to be looked up on the manuscript, then inputs the letter pattern series of the relevant portion by using the hand scanner to have that portion looked up, and finally obtains the result of the looking up. At that point, the obtained result of the looking up must be either copied over to the manuscript by hand or else memorized, so that the user is forced to carry out some extra activity associated with the use of the electronic dictionary on the manuscript.

In order to reduce the task of the user to copy down the result of the looking up on the manuscript there have been electronic dictionary apparatuses incorporating a printer device for outputting a print out of the result of the looking up, such as those disclosed in the Japanese Patent Application Laid Open No. 57-29181 (1982) and the Japanese Patent Application Laid Open No. 1-26271 (1989). However, even such an electronic dictionary apparatus with a printer is incapable of actively supporting the thinking of the user during its use.

It is also possible to realize that the electronic dictionary apparatus in which the entire document information on the manuscript can be inputted. In this type of the electronic dictionary apparatus, the user can check the input document information, as well as the result of the looking up on the display screen. This feature can be considered as an active support of the user's thinking by the electronic dictionary apparatus because it encourages thinking activity to take place as the user observes the display screen throughout the use of the electronic dictionary apparatus. For example, this feature can be quite beneficial in using the electronic dictionary apparatus in the translation process. Namely, the translation process can be carried out by using a machine translation apparatus such as those disclosed in the Japanese Patent Application Laid Open No. 56-42880 (1981) and the Japanese Patent Application Laid Open No. 60-59482 (1985). However, the translation obtained by using such a machine translation apparatus is hardly perfect, so that the human post editorial process is indispensable for a high quality translation, and the electronic dictionary apparatus can be useful assisting tool in such a post editorial process. An example of the electronic dictionary apparatus designed as the translation assisting tool is disclosed in the Japanese Patent Application Laid Open No. 61-88365 (1986), which has a desirable feature of displaying the original sentence, its translation found by the dictionary looking up, and the translated sentence.

Now, in the electronic dictionary apparatus capable of image input and letter recognition, it is desirable to adopt an operation mode in which the letter pattern series for a work is selected from the input image according to the command by the user, which is then recognized an used as a key word in the dictionary looking up. For this reason, it is indispensable for this type of the electronic dictionary apparatus to have a display for displaying the input image, and a function enabling the user to select arbitrary pattern series for the displayed image. However, in the machine translation apparatus, the original sentence is given as the letter code series alone, and a function for displaying the input image is not incorporated because incorporation of the image input function and the letter recognition function is not considered at all. Moreover, in such a machine translation result is not capable of input by key typing, so that the post editorial operation such as the addition, modification, and deletion cannot be applied to the translation result.

As for the display of the input image and the selection of the pattern series from the displayed image, there has been a proposition disclosed in the Japanese Patent Application Laid Open No. 1-169673 d(1989). In whcih, the pattern series is selected on the displayed input image by the command from the user and then recognized. However, in selecting the letter pattern series, the input image is displayed as it is inputted, so that the extraction of the letter pattern series has been difficult of the case in which the letter pattern series to be selected is spread over a plurality of line sin a form of a hyphenated word or an idiomatic phrase including a plurality of words.

Now, because the words which the user selects as the words to be looked up are presumably unknown to the user, so that the result of the dictionary looking up can be utilized for learning by the user. An example of the electronic dictionary apparatus incorporating a function to support learning by the user is disclosed in the Japanese Patent Application Laid Open No. 55-147760 (1980), in which the words looked up by the user are memorized in a form which can be used later on as so called word cards. Another example of such an electronic dictionary apparatus is those disclosed in the Japanese Patent Application Laid Open No. 57-29181 (1982) and the Japanese Patent Application Laid Open No. 63-177263 (1988), in which the results of the dictionary looking up is complied and outputted in a form of a personal check word list useful for later learning by the suer. Yet another example of such an electronic dictionary apparatus is that disclosed in the Japanese Patent Application Laid Open No. 57-38485 (1982), which incorporates a function to support the learning of the pronunciation of Chinese characters.

However, in such an electronic dictionary apparatus, each key word can be treated only as it is, without taking into account the context in which the key word appeared, the relationship with respect to the other key work, and the background information related to the field relevant to the text.

Thus, the various conventionally known electronic dictionary apparatuses are still unsatisfactory in the aspects of actively supporting the thinking activity of the user and its effective and efficient utilization.

SUMMARY OF THE INVENTION

It is therefore an object of the present invention to provide an electronic dictionary apparatus which is capable of actively supporting the thinking activity of the user during its use, and which has improved maneuverability and wider utility.

According to one aspect of the present invention thee is provided an electronic dictionary apparatus, comprising: input means for entering input document image; recognition means for automatically extracting and recognizing each letter pattern series in the entered input document in order to obtain corresponding letter code series; display means for displaying the entered input document superposed with an enclosure image enclosing each letter pattern series for each of the extracted and recognized letter pattern series; user operation means for allowing an user to specify a desire done of the letter pattern series enclosed by the enclosure image on the displaying means; and looking up means for looking up information on the letter code series corresponding to the specified letter pattern series in a data-base containing prepared information on a number of letter patterns in terms of letter codes.

According to another aspect of the present invention there is provided a method of electronic dictionary looking up, comprising the steps of: entering input document image; automatically extracting and recognizing each letter pattern series in the entered input document in order to obtain corresponding letter code series; displaying the entered input document superposed with an enclosure image enclosing each letter pattern series for each of the extracted and recognized letter pattern series; allowing an user to specify a desired one of the displayed letter pattern series enclosed by the enclosure image; and looking up information in the letter code series corresponding to the specified letter pattern series in a data-base containing prepared information on a number of letter patterns in terms of letter codes.

Other features and advantages of the present invention will become apparent from the following description taken in conjunction with the accompanying drawings.

DETAILED DESCRIPTION OF THE PREFERRED EMBODIMENTS

Figure 1:
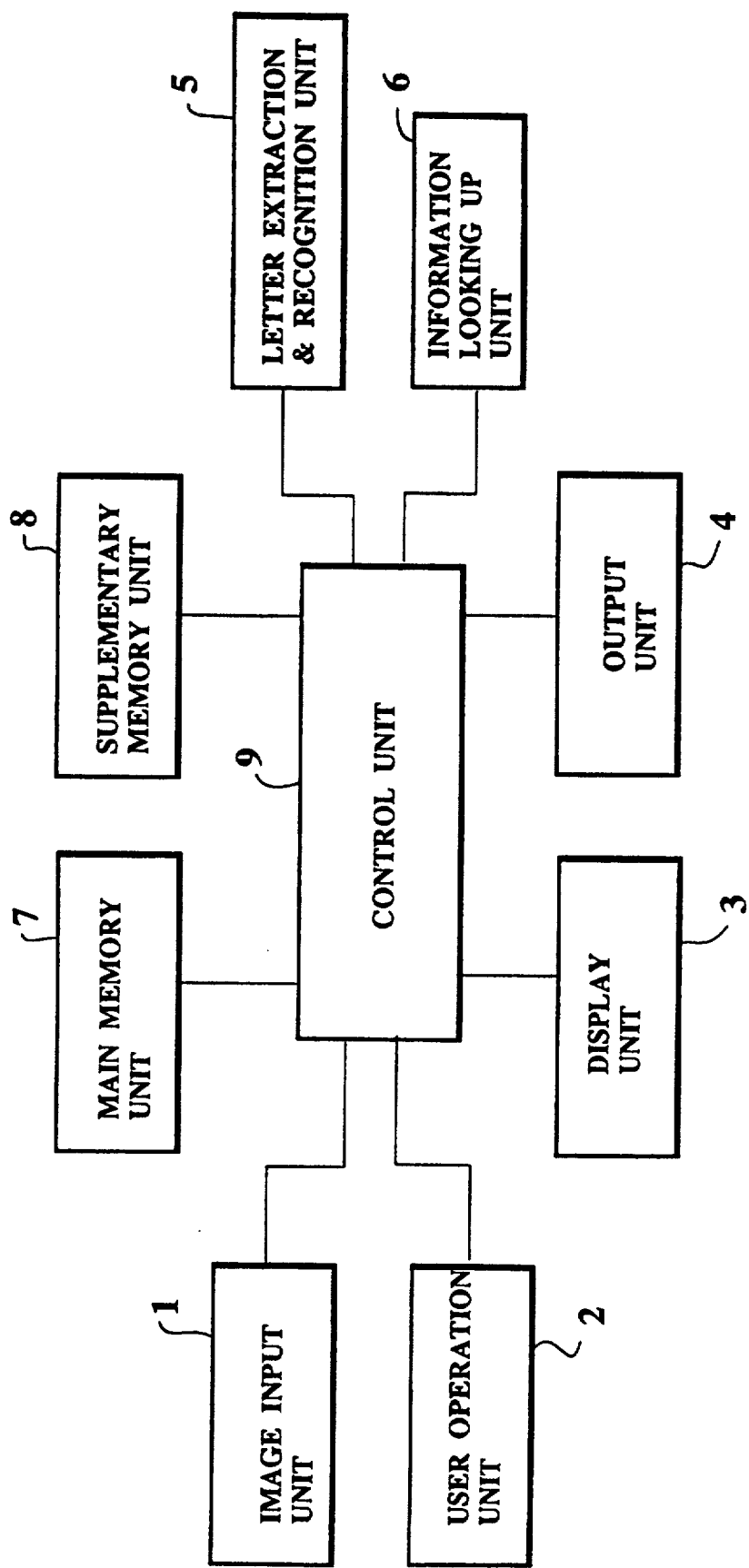
FIG. 1 is a schematic block diagram of one embodiment of an electronic dictionary apparatus according to the present invention.

Referring now to FIG. 1, one embodiment of an electronic dictionary apparatus according to the present invention will be described in detail.

In this embodiment, the electronic dictionary apparatus comprises: an image input unit 1 for inputting a document image representing a part or a whole of a manuscript; a user operation unit 2 including a mouse and a keyboard to be operated by the user; a display unit 3 for displaying the input document image, a letter pattern series to be extracted from the input document image, a looking up result such as a translation of the word represented by the extracted letter code series, and supplementary information including a mouse cursor and a menu or other messages to the user; an output unit 4 for outputting the information displayed on the display unit 3 as a print out or a synthesized voice sound; a letter extraction and recognition unit 5 for extracting a letter pattern series and converting the extracted letter pattern series into a corresponding letter code series; an information looking up unit 6 containing a dictionary data-base for looking up the dictionary data-base to find information such as a translation of the letter pattern series specified by the user by using the user operation unit 2; a main memory unit 7 for storing the information on the input document image, letter code series, and looking up result; a supplementary memory unit 8 for storing other supplementary information; and a control unit 9 for controlling operation of the apparatus.

Figure 2:
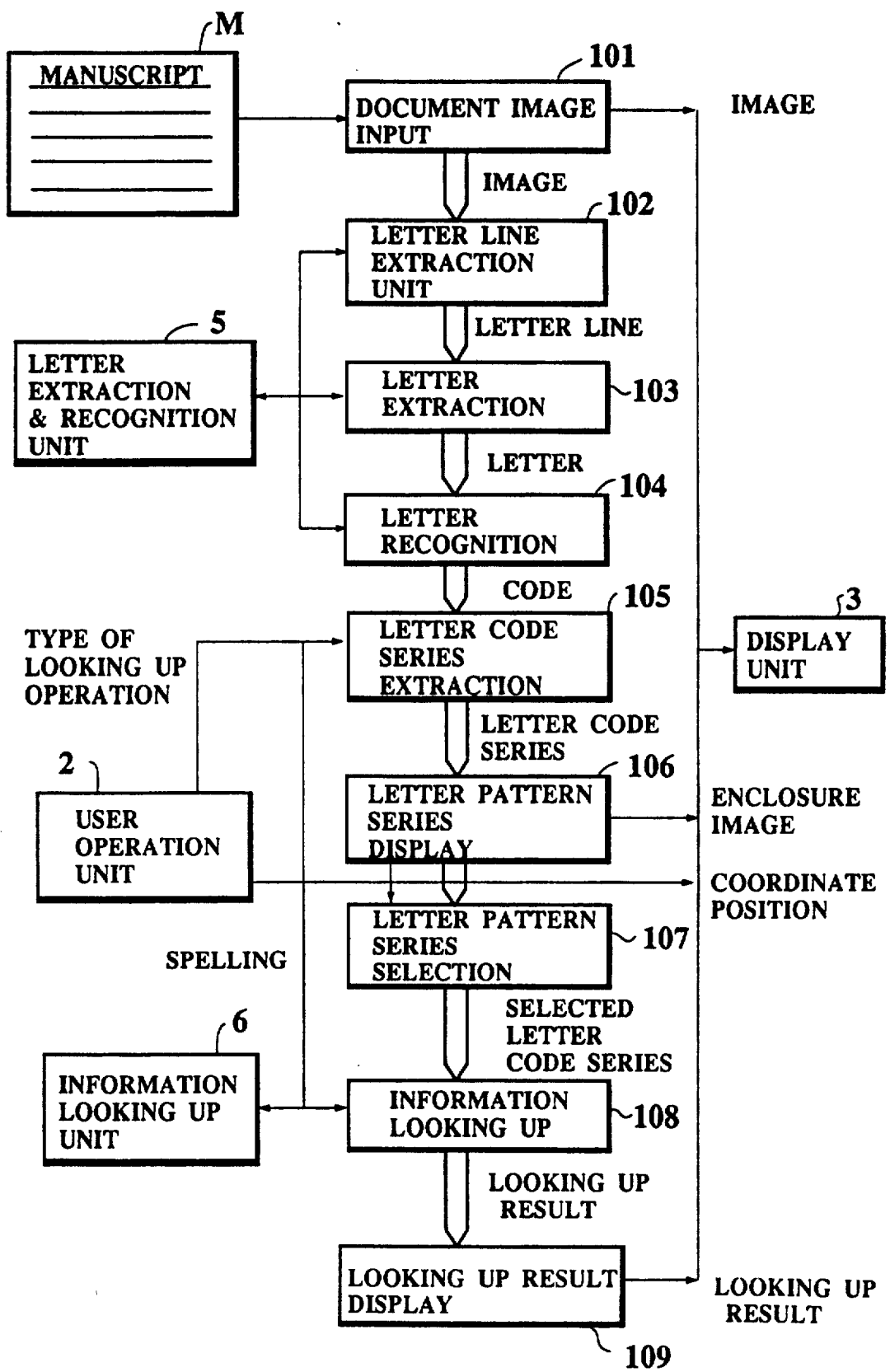
FIG. 2 is a flow chart for the operation of the electronic dictionary apparatus of FIG. 1.

The operation of this electronic dictionary apparatus generally proceeds according to a flow chart of FIG. 2, as follows.

First, at the step 101, the document image of the manuscript M is entered at the image input unit 1 which is then displayed on the display unit 3, while at the same time stored in the main memory unit 7.

As soon as the document image is entered at the image input unit 1, each letter line in the entered document image is automatically (i.e., without the user to activate this function) extracted at the step 102, and each letter in the extracted letter line is automatically extracted at the step 103, and then the extracted letter is automatically recognized, by the letter extraction and recognition unit 5 at the step 104, so as to obtain the letter codes corresponding to the letter patterns in the document image.

Figure 3:
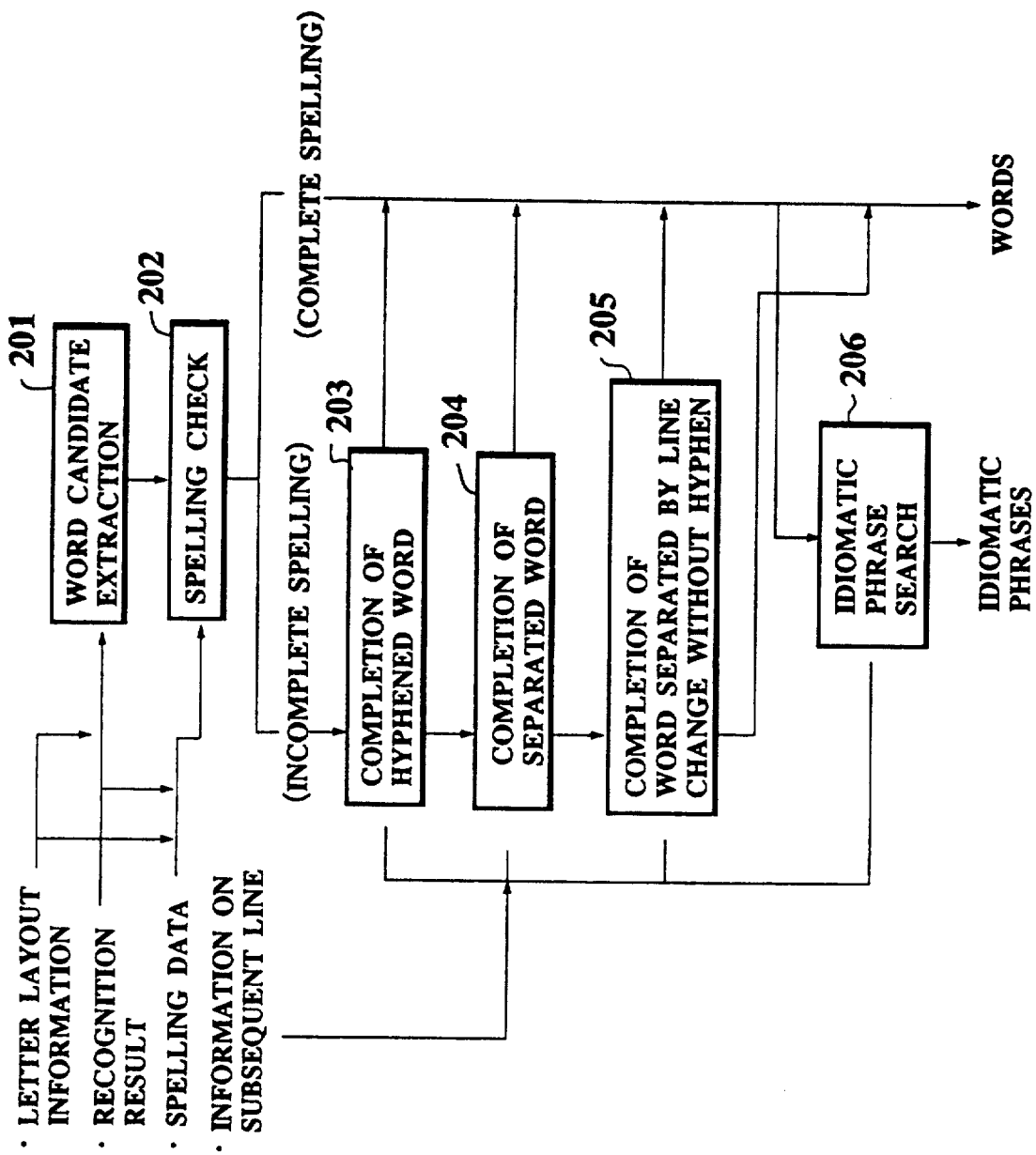
FIG. 3 is a flow chart for the detail operation of the letter code series extraction in the flow chart of FIG. 2.

Then, at the step 105, the user specified an appropriate type of the looking up operation to be carried out from a number of possible types of the looking up operation such as looking up of a word, a looking up of a phrase, etc., by operating the user operation unit 2, and in accordance with the type of the looking up operation specified by the user, the control unit 9 caries out the letter code series extraction according to the flow chart of FIG. 3 as follows.

Namely, first at the step 201, candidates for letter code series to be identified as words are extracted by using the recognition result obtained by the letter extraction and recognition unit 5 and the letter layout information concerning the layout o the letter, spacing, and punctuation marks. Then, at the step 202, the spelling of the extracted candidates are checked by using the information on the correct spelling of the possible words in the data-base of the information looking up unit 6. Here, those extracted candidates which are checked for complete spellings are identified as letter code series to be identified as words, whereas those extracted candidates which are checked for incomplete spellings are subjected to the following steps 203 to 205 in order to complete their spelling. At the step 203, the incomplete spelling of the candidate which is a hyphened word is completed by suing the information on the subsequent letter line in which the missing part of the hyphened word can be found. At the step 204, the incomplete spelling of the candidate which is a separated word such as a separated verb in German is completed by using the information on the subsequent letter lines. At the step 205, the incomplete spelling of the candidate which is a wood separated by the line change without using a hyphen is completed by using the information on the next letter line in which the missing part of such a word can be found. Finally, when the type of the looking up operation specified by the user is the looking up of a phrase, the idiomatic phrases related to the candidates of the complete spelling are searched to find out the letter code series to be identified as phrases.

Figure 4:
FIG. 4 is an example of a display of a part of an input document image with an enclosure image around each word, which is used in the electronic dictionary apparatus of FIG. 1.
Figure 5:
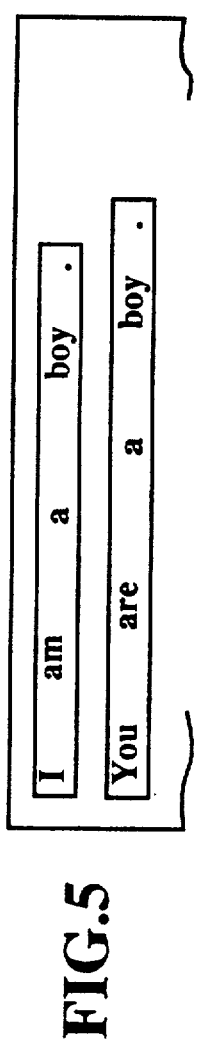
FIG. 5 is an example of a display of a pat of an input document image with an enclosure image around a group of words, which is used in the electronic dictionary apparatus of FIG. 1.

Then, at the step 106, each of the identified letter code series is indicated on the display unit 3 by a rectangular enclosure image superposed around each of the letter pattern series corresponding to each of the identified letter code series as shown in FIG. 4 and FIG. 5, where FIG. 4 represents a case in which the looking up of a word is selected by the user while FIG. 5 represents a case in which the looking up of a phrase is selected by the user.

Next, at the step 107, the user specifies the letter pattern series to be looked up on the displayed document image by pointing appropriate rectangular enclosure image enclosing that letter pattern series by operating the user operation unit 2, which identifies the coordinate position of the specified letter pattern series in the document image.

Then, at the step 108, the looking up operation of the specified type for the letter code series corresponding to the specified letter pattern series located at the identified coordinate position is carried out by the information looking up unit 6, and at the step 109 the looking up result is presented to the user by being displayed on the display unit 3.

In this electronic dictionary apparatus, because the operations of extracting and recognizing letter in the document image in order to obtain the letter code series are carried out automatically before the user specifies the letter pattern series to be looked up on the displayed document image, so that the speed of the looking up process in this electronic dictionary apparatus can be made faster than a conventional apparatus in which these operations of extracting and recognizing are carried out after the letter pattern series is specified somehow on the displayed document image. This is because it takes a significant amount of time for the user to specify the desired letter pattern series while checking the displayed document image, and in a conventional electronic dictionary apparatus the operation of the apparatus have to be suspended while this operation of specifying the desired letter pattern series by the user is carried out.

Figure 6:
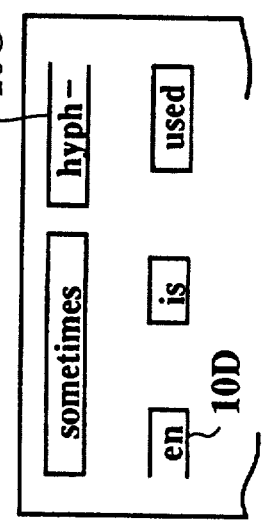
FIG. 6 is an example of a display of a pat of an input document image with separate enclosure images around separated potions of a hyphened word, which is used in the electronic dictionary apparatus of FIG. 1.
Figure 7:
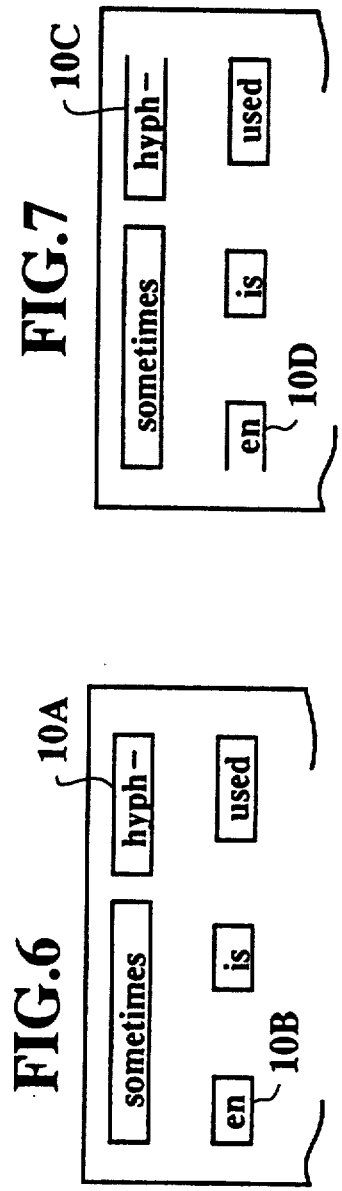
FIG. 7 is an example of a display of a part of an input document image with a single enclosure image around separated portions of a hyphened word, which is used in the electronic dictionary apparatus of FIG. 1.
Figure 8:
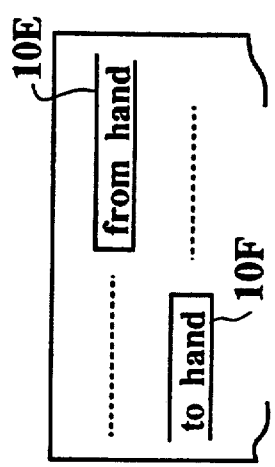
FIG. 8 is an example of a display of a part of an input document image with a single enclosure image around separated portions of a group of words, which is used in the electronic dictionary apparatus of FIG. 1.

Moreover, because of the rectangular enclosure images superposed around the letter pattern series corresponding to the identified letter code series such as those shown in FIG. 4, and FIG. 5, it becomes possible for the user to easily specify the hyphened word or a phrase extending over a plurality of letter lines, which has been impossible in a conventional electronic dictionary apparatus. For example, in a case of a hyphened word such as that shown in FIG. 6, the user can easily specify the entire hyphened word by simply pointing the rectangular enclosure images 10A and 10B in succession. Alternatively, during the process of obtaining the letter code series, the hyphen symbol itself can be detected automatically, so that as shown in FIG. 7 the hyphened word on the displayed document image can be enclosed by a single rectangular enclosure image formed by parts 10C and 10D in which case the user only need to point either one of the parts 10C or 10D in order to specify the hyphened word as a whole. Similarly, a case of looking up a group of words such as an idiomatic phrase can be handled in the same manner, so that as shown in FIG. 8, the group of words on the displayed document image can be enclosed by a single rectangular enclosure image formed by parts 10E and 10F in which case the user only need to point either one of the parts 10E or 10F in order to specify the group of words as a whole.

It is to be noted that the above embodiment of the electronic dictionary apparatus may additionally be equipped with several additional functions for facilitating the reading support, translation support, editing support, and learning support.

For example, the display unit 3 can be equipped with a large display screen capable of displaying an entire page or a substantial portion of the manuscript, and a scroll function for quickly changing the view field of the display screen at a given pitch, such that the user can read the document image on the display unit 3 easily and find the desired portion of the manuscript on the display unit 3 quickly. In this regard, the apparatus may also be equipped with a function to enlarge or contract the image at a desired rate.

Also, the apparatus can be equipped with a sentence generating and editing function such that after obtaining the looking up result, the user may operate on the apparatus to generate or edit the desired sentence on the display unit 3 by using the looking up result and the document image displayed on the display unit 3. In this manner, the apparatus actively supports the thinking of the user. Such a function is particularly effective in supporting the translation process in which the looking up operation and the sentence generating and editing operation alternate frequently.

Also, the apparatus can be equipped with an automatic practice problem generation function for automatically making up problems of various types of using those words and phrases which had been looked up by the user as problems, and outputting the generated problem as a print out which can be used by the user to check the knowledge of these words and phrases later on.

Also, the apparatus can be equipped with an on-line communication function for allowing data transfer to and from the external electronic devices such as a facsimile machine or a communication network, so that the user can easily exchange the information such as the translation of the document obtained by using the looking up operation and the sentence generating and editing function with other users at distant location.

Besides these, many modifications and variations of the above embodiments may be made without departing from the novel and advantageous features of the present invention. Accordingly, all such modifications and variations are intended to be included within the scope of the appended claims.

What is claimed is:

1. An electronic dictionary apparatus, comprising:
    image input means for entering an input document image representing an image of an input document and containing a number of letter pattern series formed by series of letter patterns;
    recognition means for extracting and recognizing each letter pattern series in the input document image entered by the image input means in order to obtain corresponding letter code series, in response to an entering of the input document image by the image input means;
    display means for displaying the input document image entered by the image input means with a superimposition of an enclosure image enclosing each letter pattern series extracted and recognized by the recognition means;
    user operation means for allowing a user to specify one of the letter pattern series which is displayed on the display means as being enclosed by the enclosure image superimposed onto the input document image displayed on the displaying means by pointing to the enclosure image enclosing said one of the letter pattern series; and
    look up means for looking up information on the letter code series obtained by the recognition means which corresponds to the letter pattern series specified by the user by using the user operation means in a data-base storing information on a number of letter patterns in terms of letter codes.

2. The apparatus of claim 1, wherein the recognition means recognizes hyphenated words, and the display means superimposes a single enclosure image around each of the hyphenated words recognized by the hyphen recognition means.

3. The apparatus of claim 1, wherein the recognition means recognizes groups of words, and the display means superimposes a single enclosure image around each of the groups of words recognized by the recognition means.

4. The apparatus of claim 1, wherein in extracting and recognizing each letter pattern series on a particular letter line, the recognition means utilizes information on subsequent letter lines in order to extract and recognize a complete letter pattern series presented over more than one letter lines.

5. A method of dictionary looking up in an electronic dictionary system, comprising the steps of:
    entering an input document image representing an image of an input document and containing a number of letter pattern series formed by series of letter patterns from an image input means of the electronic dictionary system;
    extracting and recognizing each letter pattern series in the input document image entered at the entering step in order to obtain a corresponding letter code series, in response to an entering of the input document image at the entering step by a processing means of the electronic dictionary system;
    displaying the input document image entered at the entering step with a superimposition of an enclosure image enclosing each letter pattern series extracted and recognized at the extracting and recognizing step, on a display means of the electronic dictionary system;
    specifying one of the letter pattern series which is displayed at the displaying step as being enclosed by the enclosure image superimposed onto the input document image displayed on the displaying means by pointing to the enclosure image enclosing said one of the letter pattern series, by using a pointing means of the electronic dictionary system; and
    looking up information on the letter code series obtained at the extracting and recognizing step which is corresponding to the letter pattern series specified at the specifying step in a data-base of the electronic dictionary system storing information on a number of letter patterns in terms of letter codes.

6. The method of claim 5, wherein at the extracting and recognizing step hyphenate words are recognized, and at the displaying step a single enclosure image is superimposed around each of the hyphenate words recognized at the automatically extracting and recognizing step.

7. The method of claim 5, wherein at the extracting and recognizing step groups of words are recognized, and at the displaying step a single enclosure image is superimposed around each of the groups of words recognized at the automatically extracting and recognizing step.

8. The method of claim 5, wherein at the extracting and recognizing step, in extracting and recognizing the letter pattern series on a particular letter line, information on subsequent letter lines are utilized in order to extract and recognize a complete letter pattern series presented over more than one letter lines.

* * * * *